J. BURKE.
ELECTRIC CONTROLLING APPARATUS.
APPLICATION FILED OCT. 9, 1907.
1,072,422.
Patented Sept. 9, 1913.
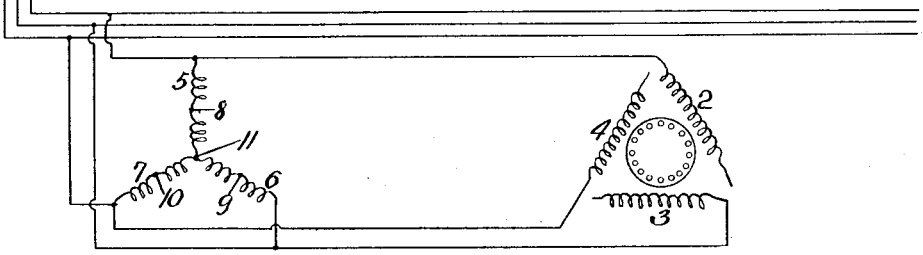
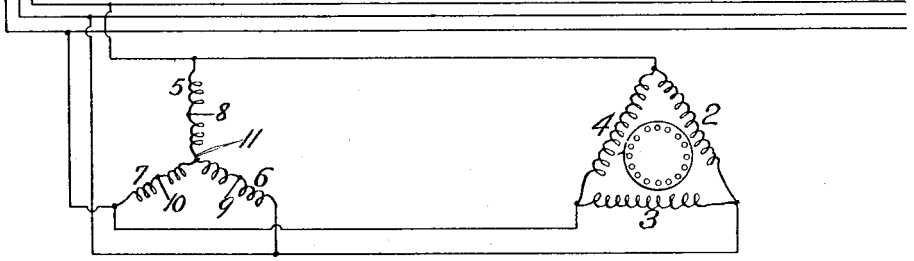
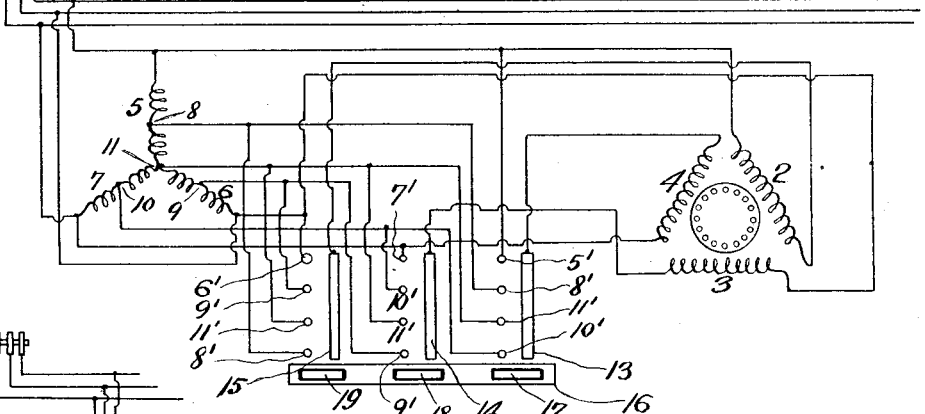
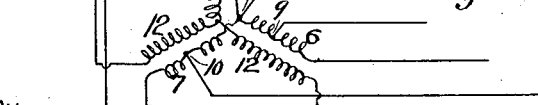
Witnesses
Geo. A. Hoffman
Geo. N. Kern
James Burke, Inventor
By his Attorneys
Edwards, Sager & Wooster

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

ELECTRIC CONTROLLING APPARATUS.

1,072,422.  Specification of Letters Patent.  Patented Sept. 9, 1913.

Application filed October 9, 1907. Serial No. 396,564.

*To all whom it may concern:*

Be it known that I, JAMES BURKE, a citizen of the United States, residing at Erie, in the county of Erie and State of Pennsylvania, have invented certain new and useful Improvements in Electric Controlling Apparatus, of which the following is a full, clear, and exact specification.

My invention relates to a method and means for controlling the electromotive force or current applied to a translating device, and is particularly applicable to the starting of induction motors, although its usefulness is not limited thereto.

Among the objects of my invention may be mentioned the increase in the capacity of the controlling apparatus over what has heretofore been used, and another important advantage is an increase in simplicity and reduction in the number of taps required for obtaining a given number of steps.

My invention will be understood from the following description and accompanying drawings, in which—

Figure 1 is a diagram of apparatus embodying my invention; Fig. 2 is a diagram thereof showing the connections when the full electromotive force is applied to the translating device; Fig. 3 is a diagram of similar apparatus and connections of the controlling means, and Fig. 4 is a diagram illustrating the use of a transformer having primary and secondary windings.

Referring to Fig. 1, a source of electric energy is indicated at 1 in the form of a three-phase generator, and in the mains extending therefrom may be connected suitable transforming apparatus as desired. As such apparatus may or may not be used and is well understood, I have omitted same from the drawings and have merely indicated a break in the transmission lines. At 2, 3 and 4 is indicated a translating device, and in this instance are represented the windings of a three-phase induction motor, although, of course, other translating devices may sometimes be used. A three-phase controlling means is represented by the windings 5, 6 and 7, which are star-connected between the supply mains, and may be in the form of a three-phase auto-transformer, or may be three single phase auto-transformers, connected as shown. Although I have indicated this apparatus as an auto-transformer, the usual transformer may be used as indicated in Fig. 4, the windings 5, 6 and 7 then forming the secondary windings to the primary windings 12. These windings 5, 6 and 7 are shown as having taps 8, 9 and 10 respectively, and a tap 11 from the common point of connection.

The three-phase windings 2, 3, 4 of the induction motor are not interconnected in Fig. 1, but one terminal of each winding is connected respectively to the outside terminals of the windings 5, 6, 7, as shown. For reasons now understood, it is desirable to apply a gradually increasing electromotive force to the windings of the induction motor in starting and so bring the motor gradually to full speed when the flow of electromotive force is applied. This is obtained in practicing my invention with increased efficiency, reduction of the capacity of the controlling apparatus, and with greater simplicity than has heretofore been possible. Referring first to the winding 2 of the motor, it will be seen that one terminal thereof is connected to the outer terminal of winding 5 of the controller. If, now, the other terminal of winding 2 be connected to the tap 8, the winding 2 will be subjected to only a portion of the electromotive force of the winding 5, and the phase thereof will, of course, correspond to the phase applied to winding 5. The winding 3 has one terminal connected to the outer terminal of winding 6, and if the other terminal of winding 3 be connected to the tap 9, the winding 3 will then receive only a part of the full electromotive force of winding 6 but of the same phase. Winding 4 has one terminal connected to the outer terminal of winding 7, and if the other terminal of winding 4 be connected to tap 10, winding 4 will then receive only a part of the full electromotive force of winding 7, but, of course, of corresponding phase. Thus, if the connections to these taps be made, a comparatively low electromotive force will be applied to each winding of the motor, and the phase displacement will be 120° corresponding with the phase displacement of the three windings of the controller. The motor will, therefore, start slowly and without severe strains on the system or apparatus. The terminal of winding 2 connected to tap 8 may now be shifted to tap 11, and similarly the terminals of windings 3 and 4 connected to the taps 9 and 10, respectively, may be shifted to tap 11. Each of the induction motor windings will then receive the electromotive force of the windings 5, 6, and 7, respectively, and of corresponding phase, resulting in an increase in speed of the motor.

If desired the connection to tap 11 may be avoided by connecting the three terminals of the induction motor windings to a common point and without any connection therefrom extending to point 11. The induction motor windings then form a Y-connection connected to the Y-connected windings 5, 6 and 7. The terminal of winding 2 from either of the above connections may next be connected to tap 9 on winding 6. The winding 2 will then be subjected to an electromotive force which in value and phase will be the resultant of the electromotive force of winding 5 and of that portion of winding 6 between taps 9 and 11. The phase of the electromotive force of winding 6 being displaced 120° from that of winding 5, the electromotive force applied to winding 2 will be the resultant in phase and value of the full electromotive force of winding 5 and of a part of the electromotive force of winding 6. In the same way, the terminal of winding 3 may be shifted to tap 10, and winding 3 will then be subjected to an electromotive force which is the resultant in phase and value of the full electromotive force of winding 6 and a portion of the electromotive force of winding 7 between taps 10 and 11. Similarly, by shifting the terminal of winding 4 to tap 5, an electromotive force which is the resultant in phase and value of that of winding 7 and a portion of winding 5 between taps 11 and 8, will be applied to winding 4. These resultant electromotive forces will be displaced from each other by 120°, and, being of an increased value, will cause a further increase in speed of the motor. The terminal of winding 2 may next be shifted from tap 9 to the outside terminal of winding 6, and, similarly, the terminal of winding 3 may be shifted from tap 10 to the outside terminal of winding 7 and the terminal of winding 4 may be shifted from tap 8 to the outside terminal of winding 5, when the condition of connection represented in Fig. 2 will result. The windings 2, 3 and 4 of the induction motor are now connected in mesh and subjected to the full electromotive force of the supply mains. The motor has, therefore, been gradually brought to the full speed operating condition.

It will be noticed that certain advantages are obtained by my invention by reason of the fact that in increasing the electromotive force on the motor windings, the electromotive force of more than one of the windings of the controller is brought into use in one or more intermediate positions and coöperate to produce the desired increase; also that each winding of the controlling apparatus serves to supply energy to more than one winding of the motor at certain intermediate positions. Thus, although the deductions and calculations of the theoretical result become somewhat complicated, yet the practical advantages in simplicity and economy accrue by reason of the combination described.

In Fig. 3 is indicated a form of switch-controlling means for carrying out the method of operation and change of connections already described with reference to Figs. 1 and 2. The parts indicated by the same reference numerals in Fig. 3 correspond to the same parts in Fig. 1. In Fig. 3 connections from the taps 8, 9, 10 and 11 extend to sets of contacts of the controlling switch, which contacts are indicated by the numerals 8′, 9′, 10′ and 11′. Connections also extend from the outer terminals of windings 5, 6 and 7 to the terminals 5′, 6′ and 7′, respectively. The terminals of windings 2, 3 and 4 which are to be connected to the different taps, are connected respectively to fixed conducting strips 13, 14 and 15. A movable element is indicated at 16 and carries insulated conductors 17, 18, and 19, which, when the movable element is raised, are adapted to engage the conducting strips 13, 14 and 15 and the various contact terminals. For example, in the initial position, the conductor 17 connects contact 10′ and strip 13 and thus connects winding 4 between the outer terminal of winding 7 and tap 10. At the same time, conductor 18 connects strip 14 with terminal 9′ which thereby connects winding 3 between the outer terminal of winding 6 and tap 9. Conductor 19 also connects strip 15 and contact 8′, and so connects winding 2 between the outer terminal of winding 5 and tap 8. A low initial electromotive force is therefore applied to the motor windings for starting the motor. When the movable element 16 is raised to engage the next set of contacts 11′, each induction motor winding will be subjected to the electromotive force of one of the windings 5, 6 and 7. In the next position, winding 2 will be connected between the outer terminal of winding 5 and tap 9, winding 3 will be connected between the outer terminal of winding 6 and tap 10, and winding 4 will be connected between the outer terminal of winding 7 and tap 8, giving a further increase in speed by the combination of electromotive forces, as already explained. In the final upper position of element 16, the connections again correspond to those represented in Fig. 2, giving the full electromotive force of the supply wires to the motor and corresponding full speed.

In passing between successive contacts, the spacing of the contacts are such that the circuits are preferably interrupted, but any other desirable arrangement may be used.

Of course, many modifications of my invention may be devised which will differ from that shown and particularly described, but yet be within the scope of my invention.

Various forms and arrangements of the controlling windings may be used, as well as the character, form and connections of the translating devices, and any desirable form of controlling switch may be employed, without departing from the scope of my invention. It will, therefore, be understood that my invention is not limited to the particular form or forms shown in the drawings.

Having thus described my invention, I declare that what I claim as new and desire to secure by Letters Patent, is:

1. The combination of a plurality of transformer windings connected in star, each of said windings being continuously connected and generating an electromotive force different in phase from each of the other of said windings, a translating device having at least one winding, and means for connecting said winding of said translating device across one of said transformer windings and a portion only of another of said transformer windings.

2. The combination of a plurality of transformer windings, having electromotive forces of different phase, a translating device and means for successively connecting said translating device first across the whole of one of said windings and then across two of said windings.

3. The combination of a plurality of transformer windings connected in star, each of said windings being continuously connected and generating an electromotive force different in phase from that of another of said windings, a translating device having at least one winding and means for successively connecting said winding of said translating device first across one of said transformer windings and then across said transformer winding and a portion only of another of said transformer windings.

4. The combination of a plurality of transformer windings connected in star, each of said windings being continuously connected and generating an electromotive force different in phase from that of another of said windings, a translating device having a plurality of elements, and means for successively connecting said elements respectively first across one of said windings and then across a combination of said windings.

5. The combination of a plurality of transformer windings connected in star, each of said windings being continuously connected and generating an electromotive force different in phase from that of another of said windings, a translating device having a plurality of corresponding elements, and means for connecting said elements respectively across one of said windings and a portion only of another of said windings.

6. The combination of a plurality of transformer windings of corresponding elements connected in star, each of said windings being continuously connected and generating an electromotive force different in phase from that of another of said windings, a translating device having a plurality of corresponding elements, and means for connecting said elements respectively first across one of said windings, then across one of said windings and a portion of another of said windings, and, finally, across two of said windings.

7. The combination with three-phase continuously connected transformer windings arranged in star, a translating device having three windings, and means for connecting each of the windings of said translating device first across one of said transformer windings, and subsequently across two of said transformer windings.

8. The combination of three-phase star-connected transformer windings, a translating device having three windings, and means for successively connecting each of the windings of said translating device to one of said transformer windings, then across one of said transformer windings and a portion only of another of said transformer windings, and finally forming a delta connection of the windings of said translating device by connecting to said transformer windings.

9. The combination of a plurality of transformer windings connected in star, each of said windings being continuously connected and generating an electromotive force different in phase from that of another of said windings, a translating device having corresponding polyphase windings, and means for individually and successively connecting said windings of the translating device first across corresponding transformer windings, and then across a combination of said transformer windings.

10. The method of operating a translating device requiring variable electromotive forces from transformer windings connected in star, which consist in impressing upon said translating device an electromotive force derived from the whole of one of said transformer windings, and subsequently the resultant of said electromotive force and an electromotive force derived from a part of another of said transformer windings.

11. The method of operating a translating device requiring variable electromotive forces from transformer windings connected in star, which consists in impressing upon said translating device an electromotive force derived from the whole of one of said transformer windings, and subsequently the resultant of said electromotive force and an electromotive force derived from the whole of another of said transformer windings.

12. The method of operating a translating device requiring variable electromotive forces from transformer windings connected in star, which consists in impressing upon said translating device an electromotive force derived from the whole of one of said transformer windings, then the resultant of said electromotive force and an electromotive force derived from a part of another of said transformer windings, and subsequently the resultant of said first-named electromotive force and an electromotive force derived from the whole of said another transformer winding.

13. The combination of a source of polyphase currents, a plurality of transformer windings connected in star to said source, a translating device having a winding, and adjustable means for successively connecting the winding of said translating device first across a portion of one of said transformer windings and then across the whole of said one transformer winding and a portion of another of said transformer windings.

In testimony whereof I affix my signature, in presence of two witnesses.

JAMES BURKE.

Witnesses:
L. K. SAGER,
GEO. A. HOFFMAN.

---

Copies of this patent may be obtained for five cents each, by addressing the "Commissioner of Patents, Washington, D. C."